(12) United States Patent
Sanz Pascual

(10) Patent No.: US 10,584,677 B2
(45) Date of Patent: Mar. 10, 2020

(54) BOLTED JOINT FOR A WIND TURBINE BLADE

(71) Applicant: NABRAWIND TECHNOLOGIES SL, Pamplona (ES)

(72) Inventor: Eneko Sanz Pascual, Pamplona (ES)

(73) Assignee: NABRAWIND TECHNOLOGIES SL, Pamplona (ES)

( * ) Notice: Subject to any disclaimer, the term of this patent is extended or adjusted under 35 U.S.C. 154(b) by 176 days.

(21) Appl. No.: 15/353,466

(22) Filed: Nov. 16, 2016

(65) Prior Publication Data

US 2017/0089324 A1    Mar. 30, 2017

Related U.S. Application Data

(63) Continuation of application No. PCT/ES2014/000088, filed on May 29, 2014.

(51) Int. Cl.
*F03D 1/06*    (2006.01)

(52) U.S. Cl.
CPC ............. *F03D 1/0675* (2013.01); *F03D 1/06* (2013.01); *F05D 2230/60* (2013.01); *Y02E 10/721* (2013.01); *Y02P 70/523* (2015.11)

(58) Field of Classification Search
CPC ... Y10T 29/53683; F03D 1/0675; F03D 1/06; B23P 19/067; B23P 15/04
USPC .......................................................... 29/466
See application file for complete search history.

(56) References Cited

U.S. PATENT DOCUMENTS

| 478,060 | A | * | 6/1892 | Kenehan | B65B 13/025 254/234 |
| 3,015,975 | A | * | 1/1962 | Biach | B25B 29/02 81/56 |
| 3,107,419 | A | * | 10/1963 | Sandlfer | F16L 23/003 29/239 |
| 3,162,071 | A | * | 12/1964 | Biach | B25B 29/02 81/57.38 |
| 3,285,568 | A | * | 11/1966 | Biach | F16B 31/043 254/29 A |
| 4,027,373 | A | * | 6/1977 | Kwast | F16L 23/006 29/256 |
| 4,773,146 | A | * | 9/1988 | Bunyan | B23P 19/067 29/407.02 |
| 4,886,244 | A | * | 12/1989 | Renault | B66F 3/42 254/93 H |
| 5,129,136 | A | * | 7/1992 | Richardson | B25B 27/16 29/239 |

(Continued)

FOREIGN PATENT DOCUMENTS

WO    2011070137 A1    6/2011
WO    WO-2012140039 A2 * 10/2012 ........... F03D 1/0658

*Primary Examiner* — Jacob J Cigna
*Assistant Examiner* — Michael W Hotchkiss
(74) *Attorney, Agent, or Firm* — Edell, Shapiro & Finnan, LLC

(57) ABSTRACT

According to some implementations a bolted joint for modular blades is provided that comprises a single bolt that joins the inserts incorporated on the flange of the beam, screwing the two modules facing each other. A spacer is added to each bolt, and the bolts is then pre-tensioned by pulling, either mechanically separating the modules with a mechanical separator or thermally by applying heaters to the bolt and coolers to the spacer, or by torqueing the bolts.

8 Claims, 13 Drawing Sheets

(56) References Cited

U.S. PATENT DOCUMENTS

| | | | | |
|---|---|---|---|---|
| 7,980,827 | B2* | 7/2011 | Stiesdal | F03D 1/0675 |
| | | | | 416/233 |
| 8,376,713 | B2* | 2/2013 | Kawasetsu | F03D 1/0675 |
| | | | | 416/226 |
| 8,388,316 | B2* | 3/2013 | Arocena De La Rua | .................. |
| | | | | B29C 70/865 |
| | | | | 416/224 |
| 8,510,947 | B2* | 8/2013 | Kirkpatrick | B23P 15/04 |
| | | | | 29/411 |
| 8,511,996 | B2* | 8/2013 | Llorente Gonzalez | ...................... |
| | | | | F03D 1/0675 |
| | | | | 416/132 B |
| 9,797,369 | B2* | 10/2017 | Kratmann | F03D 1/0633 |
| 2010/0119373 | A1* | 5/2010 | Vronsky | F03D 1/0658 |
| | | | | 416/223 R |
| 2010/0143148 | A1* | 6/2010 | Chen | F03D 1/0675 |
| | | | | 416/241 R |
| 2011/0158788 | A1* | 6/2011 | Bech | F03D 1/0675 |
| | | | | 415/1 |
| 2011/0274552 | A1* | 11/2011 | Torrez Martinez | F03D 1/0675 |
| | | | | 416/227 A |
| 2012/0321471 | A1* | 12/2012 | Grabau | F03D 7/0228 |
| | | | | 416/147 |
| 2013/0108464 | A1* | 5/2013 | McEwen | F03B 3/121 |
| | | | | 416/244 R |

* cited by examiner

BOLTED JOINT FOR A WIND TURBINE BLADE

CROSS-REFERENCE TO RELATED APPLICATIONS

This application relates to and claims the benefit and priority to International Application No. PCT/ES2014/000088, filed May 29, 2014.

TECHNICAL FIELD

The present invention addresses the bolted joint on the modules of a wind turbine blade and the process of connecting some modules obtained by specific manufacturing and a laminate more stylized than currently available.

BACKGROUND

In patent ES2265760 metal inserts are housed and secured axially on the walls of the longitudinal resistant structure (blade beam). The housings are machined and the insert connection is secured with an adhesive. A cavity (16) is machined on a solid laminate (12) of carbon fibers (13) and glass fibers (14) and an insert (10) is inserted. The insert head can be of two types: metal U-shaped parts for traction bolts and shear connection element. These heads conceived for bolting insert pairs are large and heavy, since they include a housing for enabling the connection of nuts for pre-tensioning bolts, penalizing the connection in cost and extra weight.

In patent ES2369442, the inserts are embedded and inserted (first machining them as in the previous case) into the composite material constituting the blade. The insert body has a cylinder or cone shape. There are two types according to their placement:

Machined insert: A hole is machined into an already cured lamination, into which an insert, head (2) and body (3) are inserted, and affixed with adhesive (4). The lamination is made on a continuous thickness throughout the width of the section. A disadvantage is that the lamination is very thick and has a high cost in structurally unnecessary material, adding to the total weight of the module.

Embedded insert: The insert is laminated to add a reinforcement part (5) during the lamination process. The same laminate resin bonds the insert to the material after curing. A separator (6) is also added between inserts. A disadvantage is that unlike a machining process, this manual process is not easily automated and thus highly susceptible to environmental conditions and skill level of the workers. Moreover, to attain an acceptable load capacity, an additional part (6) is incorporated. This part must also be affixed onto the metal insert before lamination. Thus, in order to eliminate the disadvantage of extra mass from the option above (machined insert), other clear disadvantages are added such as the susceptibility of the process and the elevated extra cost arising from the part and additional affixing process.

Furthermore, the tightening of joint elements used in these inserts is a complex process that either requires an external support point or is done by opposing pairs to utilize the action/reaction balance of each pair, thus requiring no external support. The connection process solution differs in the mentioned patents but always has a connection element: Patent ES2265760 uses a bolt and two nuts between opposing heads while patent ES2369442 uses two connections of a singe bolt and nut with different peculiarities (left-hand thread on insert, right-hand thread on nut and machined head for wrench fastening). In both cases, the two pairs are compensated with each other (the two-nut pair or the bolt-nut pair) and the extra support point is avoided, but in any case there is a need for a preferentially rectangular, heavy and expensive insert head enabling the housing of the mentioned nuts.

Alternatives for pre-tensioning bolts are disclosed herein. When pre-tensioning by torque, the bolts are compensated with the adjacent connection element. When pre-tensioning by pulling, the modules are separated to apply the necessary tension to the joint on all the bolts at the same time, thus eliminating the need for heads between modules and reducing the connection parts to a minimum expression and thus attaining a significant advantage in mass and cost compared with current state of the art. In both cases, all the bolts are pre-tensioned simultaneously by applying torque or pulling, which entails a substantial novelty regarding the state of the art.

SUMMARY OF THE DISCLOSURE

According to some implementations disclosed herein are modules of a wind turbine blade that are joined by a bolted joint comprising a single bolt between two threaded inserts, previously housed in the laminates of the modules. The assembly of modules so that the joint is fully simplified is also disclosed. According to some implementations the method for manufacturing the modules' laminates is characterized by being laminated solely in areas that are subsequently machined to form the housing of the insert, thus creating a stylized laminate that is cheaper and lighter.

According to some implementations laminate layers are produced with a given shape to attain, when curing, the volume that would be obtained by laminating over an insert (embedded insert) without having yet incorporated the insert.

According to some implementations two blade modules are joined through some threaded inserts to other inserts equally facing the former via a single bolt. The assembly thus formed may comprise a threaded insert contained in the blade module, a bolt with a spacer or an intermediate part and another opposing threaded inserted contained in the other blade module.

According to some implementations a method for connecting two blade modules includes the following:

Manufacturing first and second blade modules containing internal threaded inserts;

Installing bolts inside the inserts of the first module;

Aligning the second module with the first module so that the inserts of the second module are axially aligned with the bolts previously inserted into the inserts of the first module;

Turning the bolts to screw them into both inserts of the first and second modules;

Pre-tensioning the bolts simultaneously according to one of the methods described below.

According to some implementations the connection process uses procedures for pre-tensioning all the bolts at once through a separation of the modules. One such method includes the following:

Separating the first and second modules by mechanical engagement through an assembly comprising ribs and hydraulic cylinders or thermal effects on spacers associated with the bolts (contraction by cooling before placement).

Installing the spacers on the bolts;

Relaxation and completion of the pre-tensioning process

Unlike patent ES2369442, the particular advantage of this new alternative is that there is no need to change the direction of the threading when pre-tensioning through pulling and the bolt has a right-hand thread on both sides. This thus simplifies the initial insertion of bolts into the modules, a task that in any case also depends on highly specific module manufacturing details.

The pre-tensioning process can also be made by tightening torque without using an external support point to apply the tightening torque, tensioning by adjacent pairs and utilizing the action/reaction balance of each pair. For the purpose of this implementation, an intermediate part is mounted on the bolt to permit the rotation thereof. In this case, the threads on the inserts and bolts turn one in each direction on each module so that the turning creates opposite advances, whereby pulling and consequently pre-tensioning the bolt.

BRIEF DESCRIPTION OF THE DRAWINGS

Below is a brief description of a series of drawings useful for better understanding the various implementations of the apparatus and methods disclosed herein.

DETAILED DESCRIPTION

Figure 1:
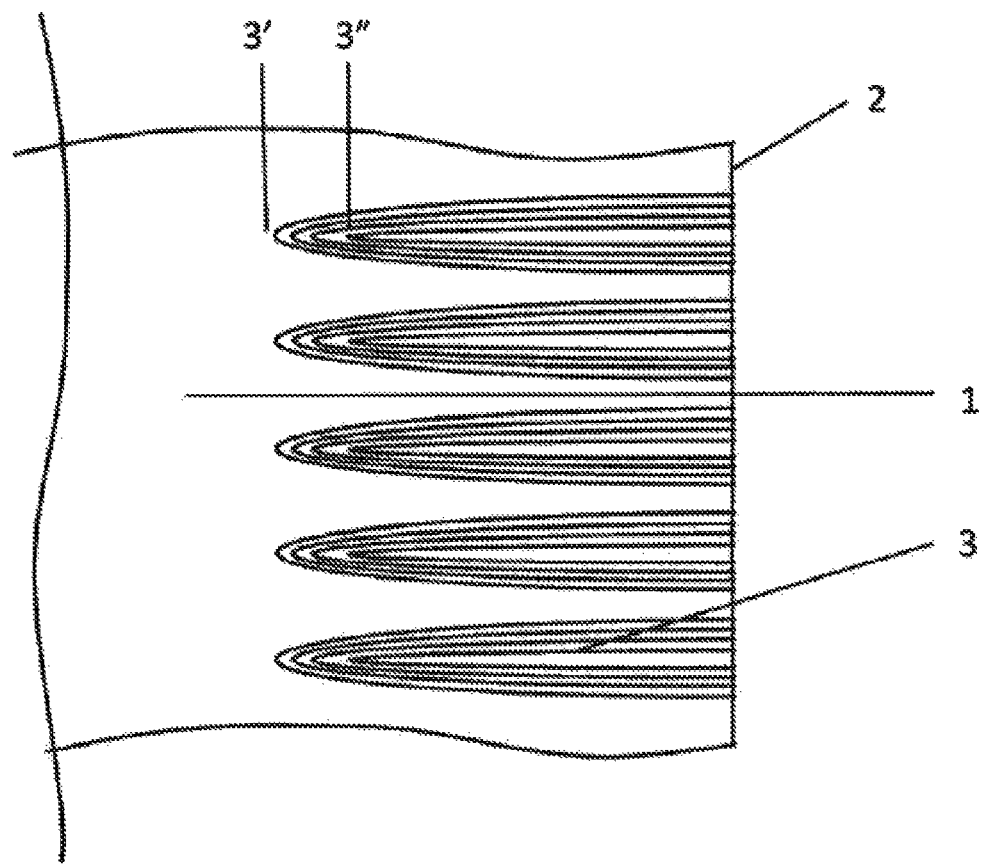
FIG. 1 is a plan view of the shape of the laminate layers in the insert area for obtaining the volume where the cavity will subsequently be machined for the inserts.
Figure 2:
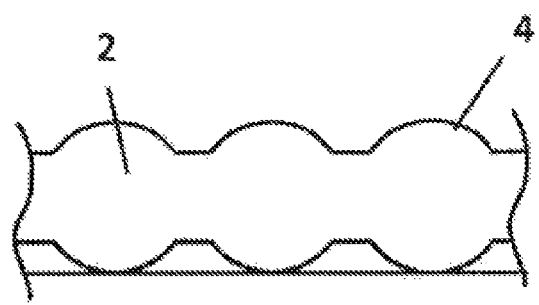
FIG. 2 depicts a cross-section of selected lamination before machining the cavities for the inserts.

FIG. 1 is a cross-section plan view of a wind turbine blade module 1 according to one implementation. The module 1 is part of the blade beam and its main characteristic is that only the parts where the inserts will be housed on the part corresponding to the free wall 2 are laminated to reinforce these areas with an accumulation of layers. As these layers of laminate 3 will be superimposed from the longest layer 3' to the shortest layer 3", the laminate available on the surface of the module 1 may form a circular protrusion 4 as shown in FIG. 2. This thus enables the lamination of only the volume corresponding to the spot that will be machined and subsequently house the inserts. The layers of laminate 3 are made during the beam-shaping process and the circular protrusions 4 are created after curing along the entire upper and lower part of the free walls 2 of the beam. This process can be done automatically or manually, layer by layer or by forming small prefabricated elements.

Figure 3:
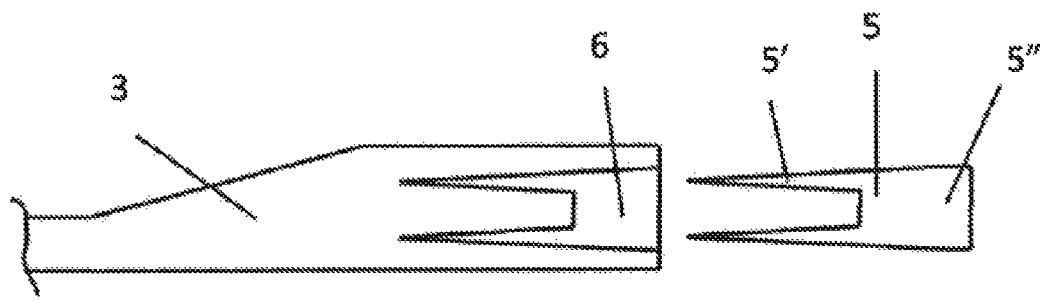
FIG. 3 is a cross-section and profile view with the lamination, housing and insert positioned before insertion.
Figure 4:
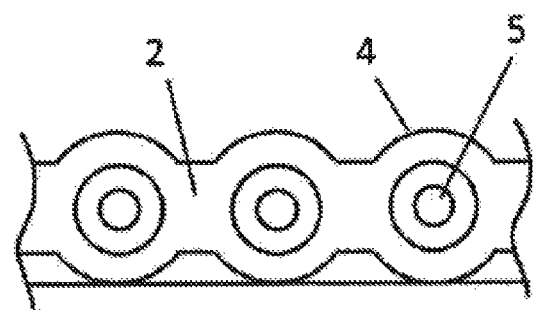
FIG. 4 illustrates a lamination cross-section with the inserts in the housings.

FIG. 3 depicts a laminated volume 3, a housing 6 and an insert 5. The insert 5 has a body 5' and a head 5" where, subsequently, when affixing the inserts and facing their free wall, a thread will be machined therein. This connection is thus made by machining the housing 6 to face the free wall 2 and subsequently fitting the inserts 5 into the housings 6 and then affixing with an adhesive, yielding the results shown in FIG. 4. Finally, with a view to controlling the longitudinal and angular position of the threads on the inserts, their free surfaces are faced as the last step in machining the threads. With the foregoing, the module 1 is thus ready for connection with another module.

Figure 5:
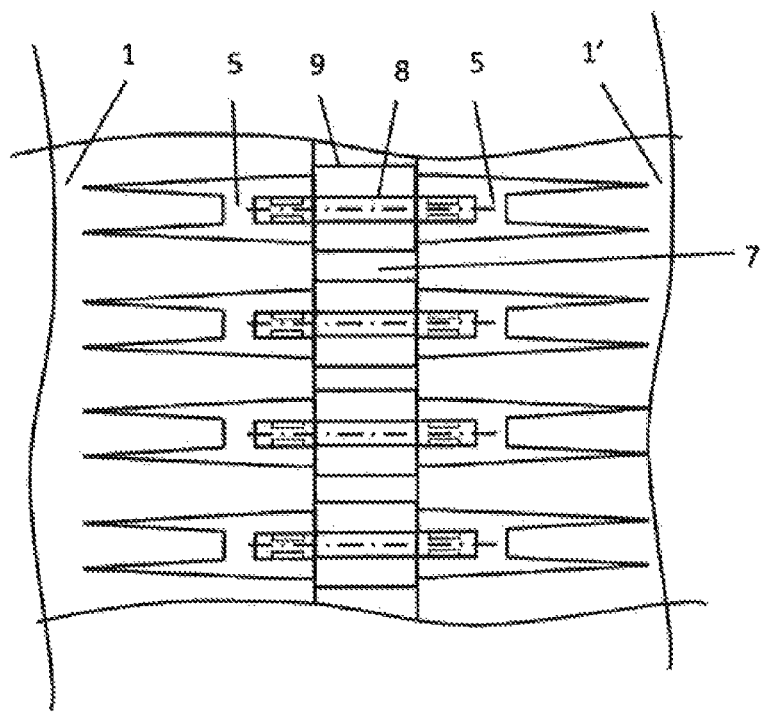
FIG. 5 is a cross-section in plan view of two blade modules facing each other.

According to some implementations first and second blade modules 1 and 1' are connected via inserts 5 with internal threads that enable a connection through a single bolt per pair of facing inserts 5 as shown in FIG. 5. The connection method may include the following steps:

Screwing all the bolts 8 into the inserts 5 of the first blade module 1;

Aligning the inserts of the second blade module 1' with the bolts 8;

Turning the bolts 8 to screw them into the inserts 5 of both the first and second modules 1 and 1'.

At this point, the modules 1 and 1' are coupled with the bolts 8 and there is a gap 7 between them. The appropriate tension in this connection can be attained by a) separating the first and second modules with by mechanical force and inserting a spacer part on the bolt, or b) putting a thermally retracted spacer part on the bolt.

Figure 6A:
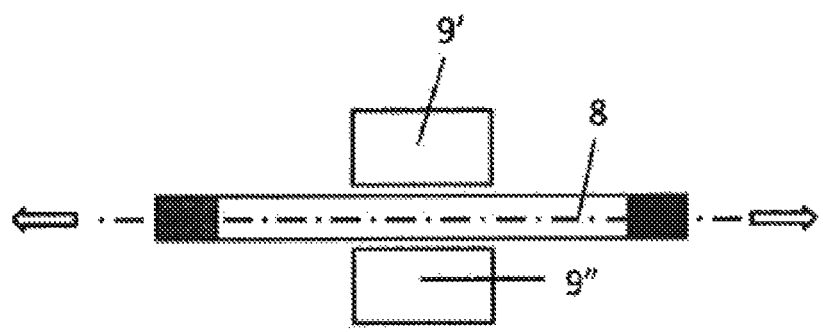
FIGS. 6A and 6B are front and side views, respectively, of a bolt and spacer subdivided into two parts.
Figure 6B:
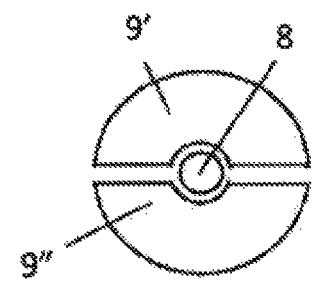

FIGS. 6A and 6B depict a bolt 8 with the spacer part 9 covering it. In the implementation of FIG. 6 the spacer part 9 comprises two semi-cylindrical segments with an upper segment 9' and a lower segment 9". This subdivision is necessary because the placement of spacers between the free faces of the inserts is made when the bolts are already in place.

Figure 7A:
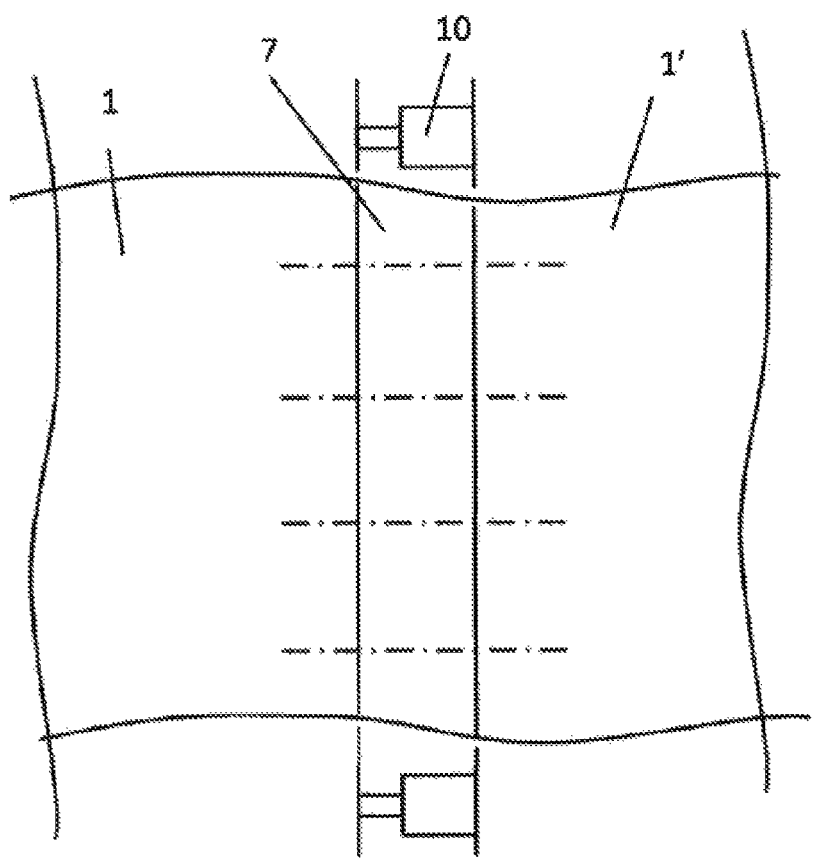
FIGS. 7A-D depict a method of connecting blade modules according to one implementation.
Figure 7B:
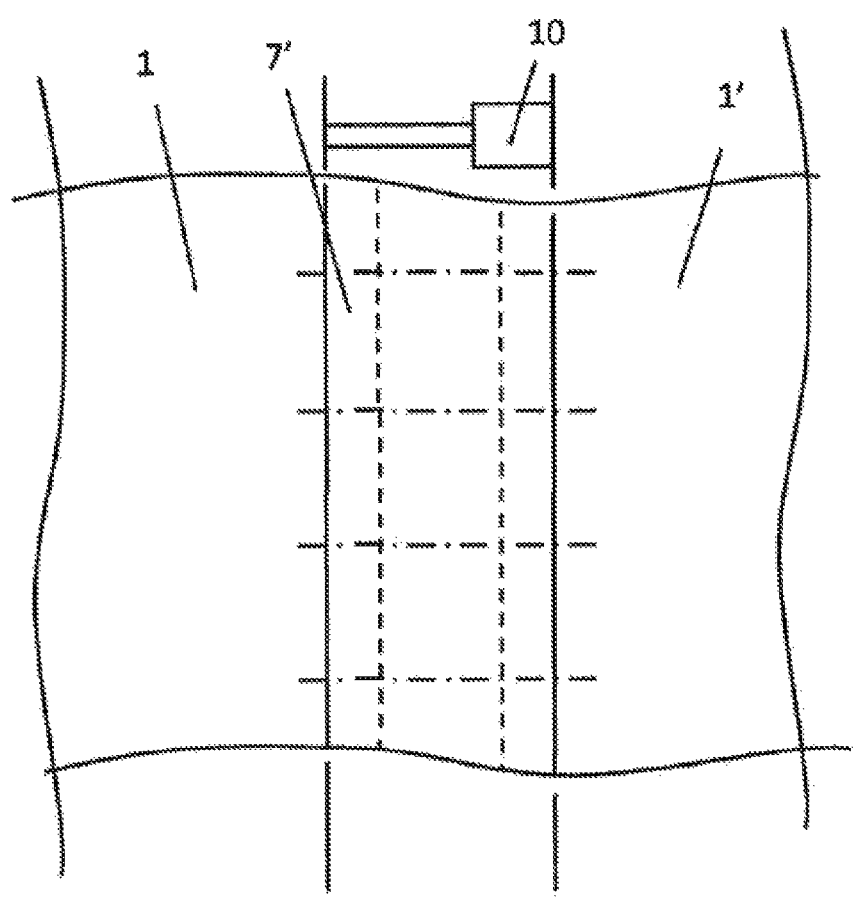
Figure 7C:
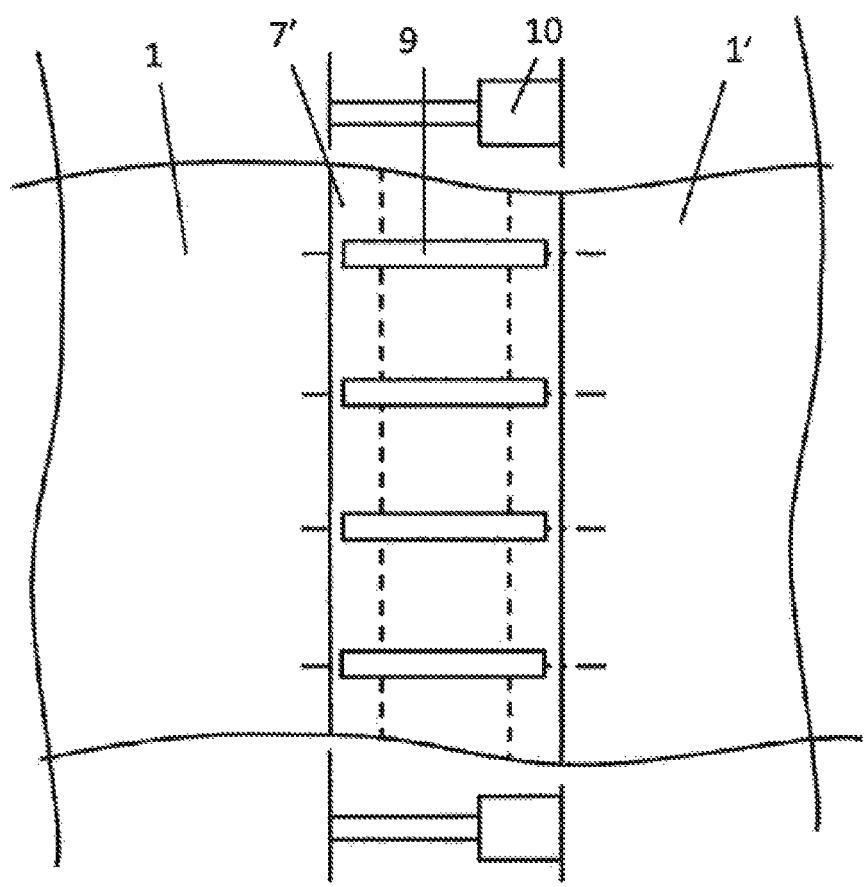
Figure 7D:
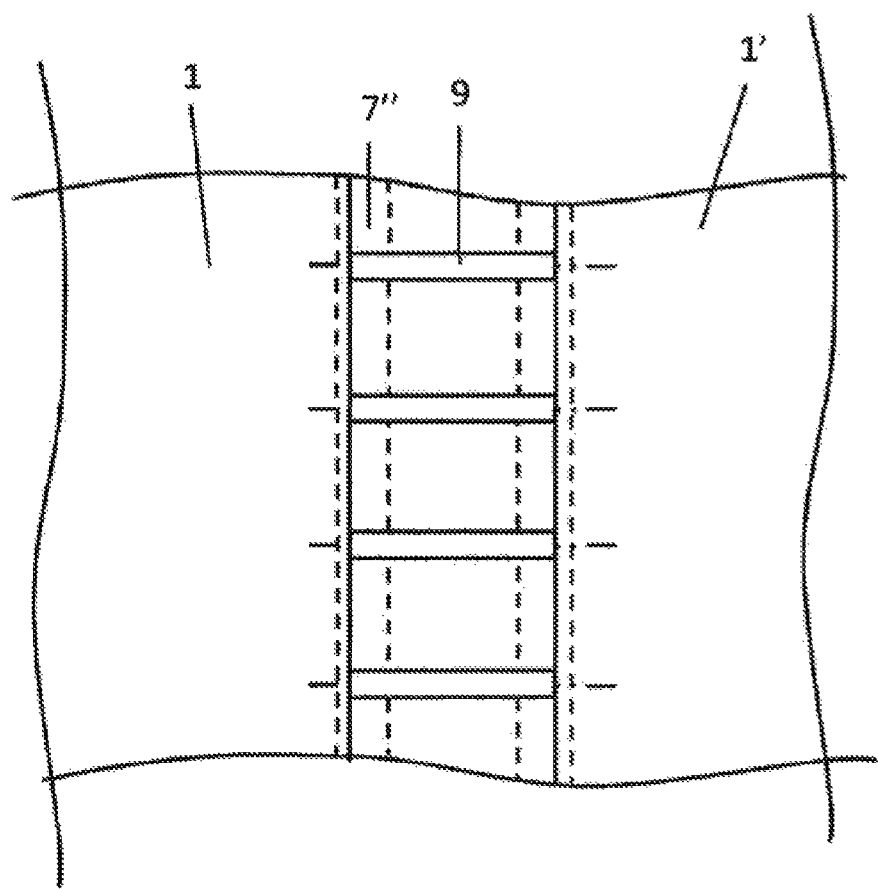

FIGS. 7A-D illustrate the different stages of separating the modules 1 and 1' via mechanical separation according to one implementation. In FIG. 7A a mechanical separator 10 is positioned between the modules 1 and 1'. The mechanical separator 10 then acts to widen the gap 7 between the modules to create a wider gap 7' as shown in FIG. 7B. This widening of the gap results in the ends of the bolts being pulled in opposite directions. According to one implementation a spacer part 9 is then incorporated on each bolt 8 to cover it as shown in FIG. 7C. The length of the spacer part 9 is less than the widened gap 7' but longer than the initial gap 7. When the mechanical separator 10 is disengaged the new gap 7" assumes the width of the spacer part 9 which is smaller than the widened gap 7' and larger than the initial gap 7. This maintains the spacer parts 9 compressed between the modules and the bolts pre-tensioned. This thus creates a traction connection pre-tensioned by pulling.

Figure 8A:
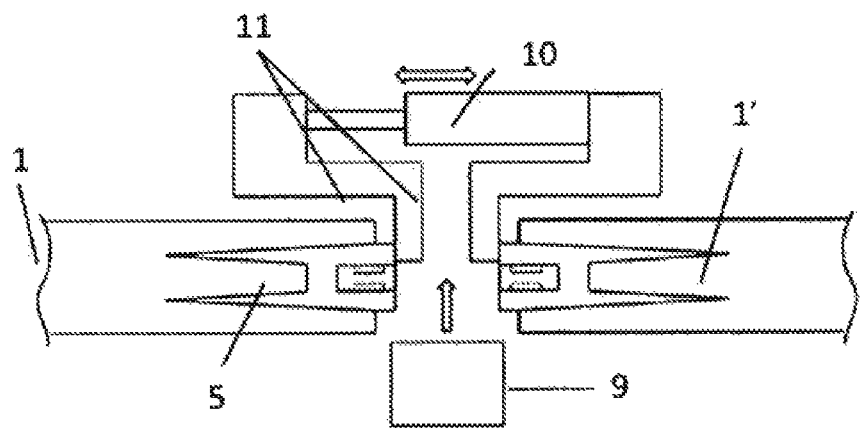
FIGS. 8A and 8B depict examples of inserting mechanical spacers between the blade modules.
Figure 8B:
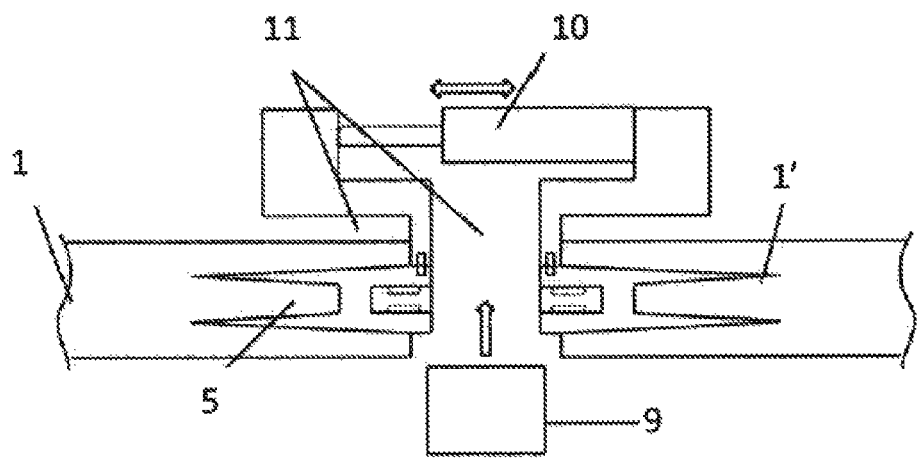
Figure 9:
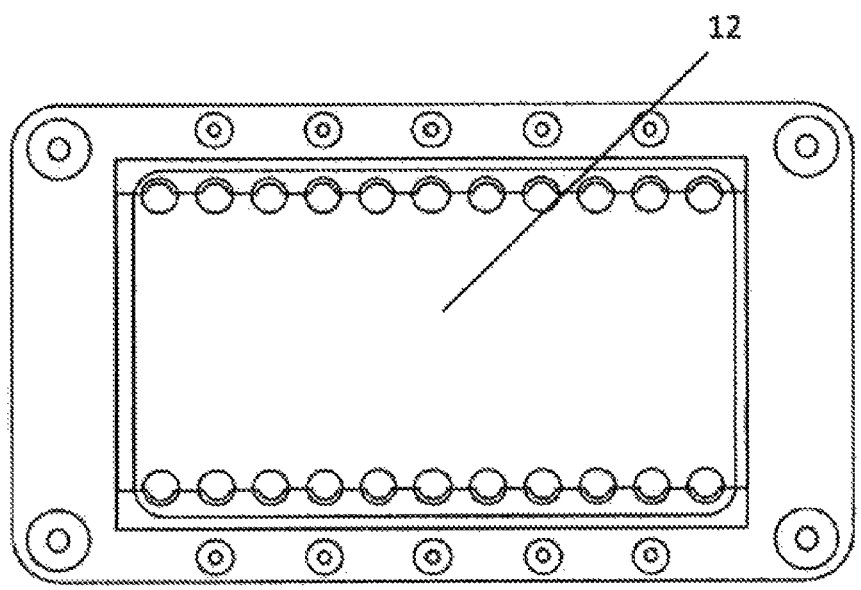
FIG. 9 illustrates a template to employ on the modules for applying the spacers.

FIGS. 8A and 8B depict various ways to cause a separation of the modules 1 and 1'. The ends 11 of the mechanical separator 10 can be arranged to engage on the free faces of the inserts 5 as shown if FIG. 8A or on the sides of the inserts 5 with shearing pins as shown in FIG. 8B. The selection of the manner of engagement will be determined by the dimensions of the initial gap 7 and the space necessary for accommodating the spacers. If the engagement is made on the side of the insert 5 there will be elements that secure both parts such as pins, cotters or similar elements. The separating load can be distributed through a template 12 as shown in FIG. 9. The template 12 may be used when the selected pre-tensioning system is the simple mechanical separation of the modules through mechanical separators 10 such as hydraulic cylinders. The template 12 serves to transmit the force of the hydraulic cylinders between both modules 1 and 1' and therefore separate the modules from each other. The template 12 has sufficient rigidity to resist warping so that a substantially homogenous pulling of the bolts 8 is achieved.

Another option for effectuating a pre-tensioning of the bolts 8 is achieved through thermal effects. According to one implementation the bolt 8 is dilated so that the initial gap 7 between the modules 1 and 1' increases to a wider gap enabling the incorporation of a spacer 9 that has been previously contracted by cooling. For example, liquid nitrogen can be used for cooling and contracting the spacers 9 and electrical resistors used for heating and dilating the bolts 8. The length of the spacers at ambient temperature must be greater than the width of the initial gap between the modules 1 and 1', and the length of the contracted spacers should be less than the width of the wider gap between the modules when the bolts are dilated. The return of both elements to their normal state thus provokes the compression of the spacer 9 and the pulling or pre-tensioning of the bolts 8.

Pre-tensioning by torque can be achieved via a variety of means as shown in FIGS. 10A-F. The bolt 8 can be accompanied by an intermediate part 13, 13', 13" and 13''' whose purpose is not restricted to a spacer part as utilized in the previously disclosed implementations, but can also be an intermediate part that provides an operable surface for the bolt 8 for applying torque to create the pre-tensioning when compressing the spacer.

Figure 10A:
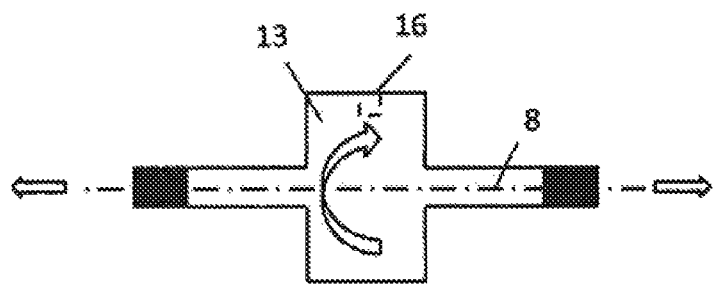
FIGS. 10A-F depict different implementations of intermediate parts enabling the application of torque to the bolts used to join blade modules.
Figure 10B:
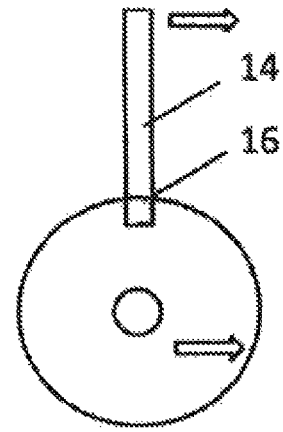
Figure 10C:
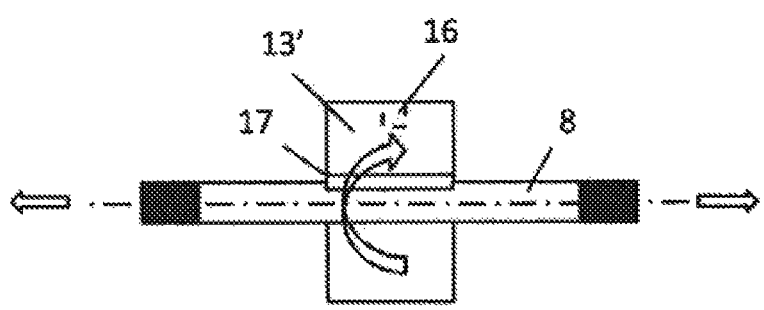
Figure 10D:
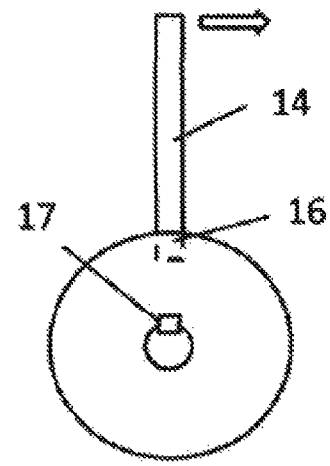
Figure 10E:
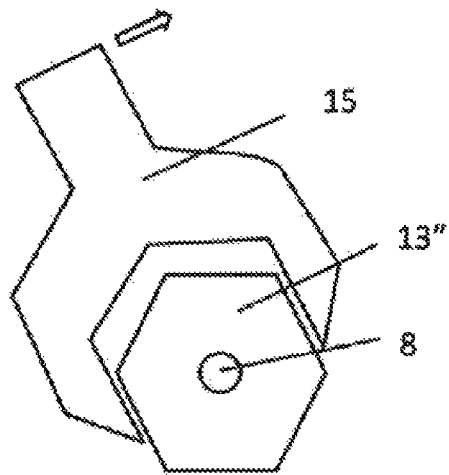
Figure 10F:
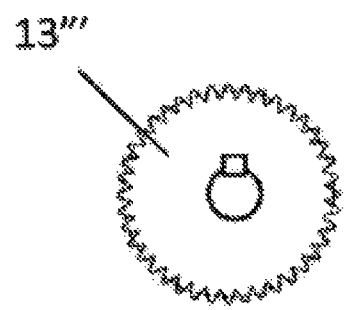
Figure 11:
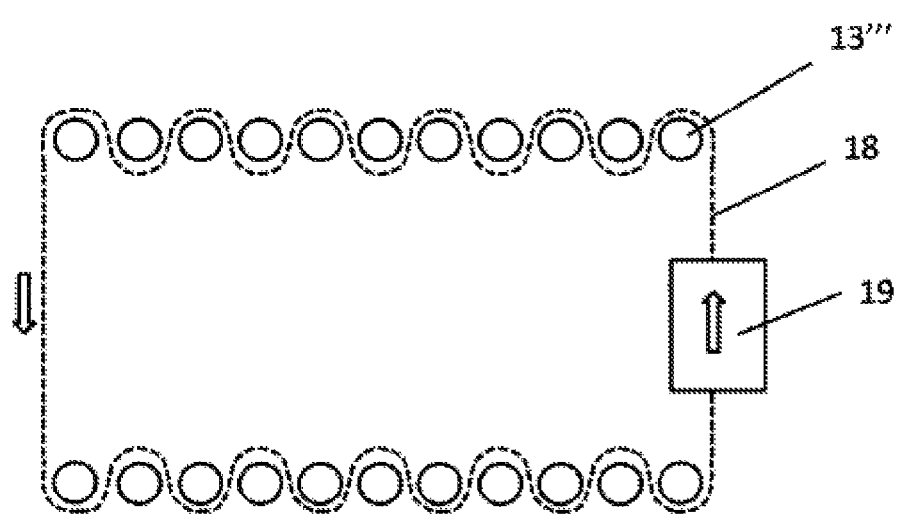
FIG. 11 illustrates a joint engagement of a pinion-chain tightening device on a blade module.

According to some implementations the intermediate part includes means for applying rods 14, wrenches 15 or other devices to apply torque to the assembly. When pre-tensioned by torque the bolt 8 has a left-hand thread at one end and a right-hand thread at the other end so that the rotation creates opposing advances on each end and is pulled. FIGS. 10A and 10B depict an intermediate part 13 formed as a unitary part with the bolt 8. The intermediate part 13 has a hole 16 on its surface to house a rod 14 with which torque can be applied. FIGS. 10C and 10D depict an intermediate part 13' comprising two parts joined together with, for example, a cotter pin 17 on the bolt. The intermediate part 13' also has a hole 16 that is configured to receive the end of a rod 14 for the purpose of applying a tightening torque. FIG. 10E depicts another implementation of the intermediate part 13" incorporated on the bolt 8 or as a part against it, which presents a hexagonal shape that permits the use of conventional wrenches 15 for applying torque to the bolt assembly. FIG. 10F depicts another alternative for the intermediate part. The outer surface of the intermediate part 13''' is conferred with a teeth 30 distributed about the circumference of the intermediate part 13'''. The teeth of the intermediate part 13''' are configured to engage the elements of a chain 18 so that a full tightening torque for all the bolts 8 can occur in unison as shown in FIG. 11. A motor 19, as shown in FIG. 11, may be employed to move the chain 18. The tightening torque can thus be applied to achieve a action/reaction balance without requiring an external support for tensioning.

Figure 12:
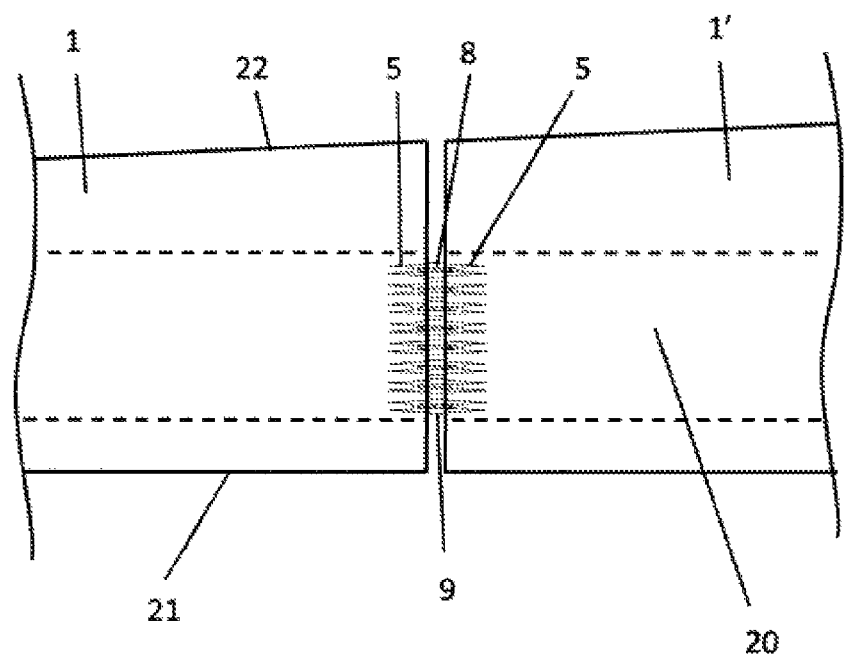
FIG. 12 depicts two blade modules after having been connected.

FIG. 12 depicts the two modules 1 and 1' joined with their respective bolts 8 on which the spacers 9 are incorporated. The part corresponding to the inserts 5 are to be covered subsequently with a fairing and mounted on the flange of the beam 20 of the blade located between the leading edge 21 and the trailing edge 22 of the blade.

According to some implementations systems and methods of assembling a wind turbine blade modules are provided according to Clauses 1 through 12 below.

Clause 1. Bolted joint for modular blades that comprises two modules 1 and 1' that house threaded inserts 5 between its composite material laminates, and facing one another, characterized in that the connection is made with a single bolt 8 threaded on both ends:

both threads are right-hand threads and a spacer 9 is added to the bolt 8 in the center, it is pre-tensioned by pulling, mechanically separating the modules with a mechanical separator 10 or thermally by applying heaters to the bolt 8 and coolers to the spacer 9; or one end has a left-hand thread and the other end has a right-hand thread so that the turning motion produces opposing advances on each end, thus pulling the bolt 8, incorporating an intermediate part 13 to the cited bolt (8) for handling, and the pre-tensioning is done by applying torque.

Clause 2. Bolted joint for modular blades according Clause 1, characterized in that the intermediate part incorporated on the bolt 8 or integrated on the bolt 8 provides a surface with a hole 16 for applying a rod 14 to tighten in pairs, a hexagonal surface 13" for applying a wrench 15 or toothed surface 13''' for applying a chain 18 to engage all the inserts 5 simultaneously and moved in turn by an external motor 19.

Clause 3. Bolted joint for modular blades according to Clause 1, characterized in that the mechanical separator 10 has two arms 11 that engage the end of the insert 5 through a template 12 or by attaching to the insert walls 5 through a pin or cotter pin.

Clause 4. Bolted joint for modular blades according to Clause 1, characterized in that the spacer 9 comprises two parts, preferentially of aluminum, that are cooled with liquid nitrogen and the bolt 8 is heated with electrical heaters.

Clause 5. Method to bolted joint for modular blades in which the connection of the inserts 5 housed by machining inside the opposing modules 1 and 1' is characterized in that the connection between inserts 5 is made through a single bolt 8 with two threaded ends on the inserts incorporated on both modules 1 and 1' for which the process below is followed:

a. Manufacture of modules 1 and 1' where the creation of threads on the inserts 5 is done as a final step following facing of the connection surface of these modules 1 and 1';

b. Insertion of bolts 8 into a module 1;

c. Precision positioning of the other module 1' against it;

d. Turning bolts 8 so that the bolt penetrates the new module 1' e. Pre-tensioning

Clause 6. Method to bolted joint for modular blades according to Clause 5, characterized in that pre-tensioning is done on all the bolts simultaneously by pulling with thermal effects and the threads are right-hand threads, in the following steps:

i) dilation of the bolts 8 through electrical resistors, ii) contraction of the spacers 9 through previous cooling, ii) insertion of these spacers 9, subdivided into two parts to simplify their incorporation on both sides of the already mounted bolts 8, iii) relaxation of the dilation of the bolt 8 and contraction of the spacer 9 by ambient temperature.

Clause 7. Method to bolted joint for modular blades according to Clause 5, characterized in that pre-tensioning is done on all the bolts simultaneously by pulling and the threads are right-hand threads with a view to enabling the following assembly process:
  i) separation of the modules with a mechanical separator 10,
  ii) insertion of a spacer 9, subdivided into two parts to simplify its incorporation on both sides of the already mounted bolts 8,
  iii) relaxation of the mechanical spacer 10.

Clause 8. Method to bolted joint for modular blades according to Clause 5, characterized in that pre-tensioning is done by mechanical engagement through a motor 19 that moves a chain 18 and simultaneous application of torque on all toothed inserts 13''' of the module.

Clause 9. Method of manufacturing a modular blade comprising two modules in which various housings are machined and inserts are incorporated, characterized in that
  lamination is only done on the free wall 2 of the module, in spots where the housing is subsequently machined,
  the form of the layers 3 is shaped so that the final volume following curing is the cavity for housing the insert 5,
  the housing 6 is machined,
  metal inserts 5 are affixed.

What is claimed is:

1. A method of connecting first and second modules of a wind turbine blade, each of the first and second modules having a plurality of respective first and second threaded inserts that respectively have first and second surfaces that face one another, the method comprising:
  joining the first and second modules by the use of a plurality of bolts, each bolt having a first threaded end and a second threaded end, the first threaded end being threaded into one of the first threaded inserts and the second threaded end being threaded into one of the second threaded inserts by rotating the bolt in a first direction, the bolt being rotated to produce a gap having a first length, the first length being a distance between the facing first and second surfaces of the respective first and second threaded inserts; and
  simultaneously tensioning the plurality of bolts by:
    (a) applying a force to mechanically separate the first and second modules in a manner to simultaneously elastically elongate the plurality of bolts and to produce a gap having a second length between the first and second threaded inserts, the second length being a distance between the facing first and second surfaces of the respective first and second threaded inserts, the second length being greater than the first length, the plurality of bolts including a first number of bolts and the force being applied by a second number of mechanical separators, the first number being greater than the second number,
    (b) inserting one or more spacers having a third length in the gap having the second length, the third length being greater than the first length and less than the second length,
    (c) terminating applying the force so that the bolts elastically shorten and a gap of the third length is established between the first and second threaded inserts.

2. The method according to claim 1, wherein each of the first and second threaded ends of each bolt comprise right-handed threads.

3. The method according to claim 1, wherein each of the bolts is at least partially surrounded by one of the spacers.

4. The method according to claim 1, wherein prior to joining the first and second modules each of the first and second threaded inserts is respectively integrated into a composite material laminated portion of the first and second modules.

5. The method according to claim 1, wherein the one or more spacers are respectively positioned on one or more of the plurality of bolts.

6. The method according to claim 1, wherein applying the force to mechanically separate the first and second modules includes applying a first force to the first threaded insert in a first direction and applying a second force to the second threaded insert in a second direction opposite the first direction.

7. The method according to claim 6, wherein the first force is applied to a face of the first threaded insert and the second force is applied to a face of the second threaded insert.

8. The method according to claim 6, wherein the first force is applied to a side of the first threaded insert and the second force is applied to a side of the second threaded insert, the first and second forces being applied to the first and second sides of the respective first and second threaded inserts by the use of pins extending into the sides of the first and second threaded inserts.

* * * * *